US007617579B2

(12) United States Patent
Natsume

(10) Patent No.: US 7,617,579 B2
(45) Date of Patent: Nov. 17, 2009

(54) EYEGLASS LENS PROCESSING APPARATUS

(75) Inventor: Katsuhiro Natsume, Toyohashi (JP)

(73) Assignee: Nidek Co., Ltd., Aichi (JP)

( * ) Notice: Subject to any disclaimer, the term of this patent is extended or adjusted under 35 U.S.C. 154(b) by 719 days.

(21) Appl. No.: 11/413,592

(22) Filed: Apr. 28, 2006

(65) Prior Publication Data

US 2007/0015440 A1 Jan. 18, 2007

(30) Foreign Application Priority Data

Apr. 28, 2005 (JP) .......................... P2005-133541

(51) Int. Cl.

| | |
|---|---|
| ***B23P 15/00*** | (2006.01) |
| ***B23Q 11/10*** | (2006.01) |
| ***B24B 55/02*** | (2006.01) |
| ***B24B 51/00*** | (2006.01) |
| ***B23B 41/00*** | (2006.01) |

(52) U.S. Cl. .............................. 29/26 A; 29/28; 451/5; 451/7; 451/42; 451/43; 451/54; 408/61; 408/3

(58) Field of Classification Search ................. 29/26 A, 29/26 R, 28; 451/5, 7, 41, 42, 43, 54; 408/56, 408/61, 3

See application file for complete search history.

(56) References Cited

U.S. PATENT DOCUMENTS 5,333,412 A 8/1994 Matsuyama
RE35,898 E 9/1998 Shibata et al.
6,336,057 B1 1/2002 Obayashi
6,572,460 B2 * 6/2003 Mizuno ....................... 451/43
6,790,124 B2 9/2004 Shibata
6,859,336 B1 2/2005 Wada et al.
6,902,467 B2 * 6/2005 Jinbo ............................ 451/5
6,984,161 B2 1/2006 Suzuki et al.
7,322,082 B2 * 1/2008 Natsume et al. ............... 29/260
2003/0087584 A1 * 5/2003 Shibata .......................... 451/5
2008/0096466 A1 * 4/2008 Eisenberg ...................... 451/5
2009/0036040 A1 * 2/2009 Tanaka ....................... 451/255

FOREIGN PATENT DOCUMENTS

| | | | |
|---|---|---|---|
| JP | 4-93164 | A | 3/1992 |
| JP | 5-212661 | A | 8/1993 |
| JP | 11-309057 | A * | 11/1999 |
| JP | 2003-145328 | A | 5/2003 |
| JP | 2003-300139 | A | 10/2003 |
| JP | 2004-106147 | A | 4/2004 |

* cited by examiner

*Primary Examiner*—Erica E Cadugan
(74) *Attorney, Agent, or Firm*—Sughrue Mion, PLLC

(57) ABSTRACT

An eyeglass lens processing apparatus includes a lens holding unit for holding an eyeglass lens, a roughing tool, a finishing tool, a drilling tool, a processing water supply unit for applying processing water to a processed part of the lens held by the lens holding unit, and a controller for controlling driving operations of each of the processing tools and the processing water supply unit in order to execute roughing for the lens by the roughing tool without application of the processing water, drilling for the lens by the drilling tool without the application of the processing water after the roughing and finishing for the lens by the finishing tool with the application of the processing water after the drilling.

6 Claims, 11 Drawing Sheets

EYEGLASS LENS PROCESSING APPARATUS

BACKGROUND OF THE INVENTION (1) Technical Field

The present invention relates to an eyeglass lens processing apparatus for processing eyeglass lenses.

(2) Related Art

There has been known an eyeglass lens processing apparatus comprising a peripheral edge processing mechanism for grinding a peripheral edge of a lens of an eyeglasses by a peripheral edge processing tool such as a grindstone based on a target lens shape, for example, a shape of a rim of an eyeglass frame. In recent years, moreover, there has also be proposed an apparatus comprising a drilling mechanism for forming a hole to attach a rimless frame such as a two-point frame to a lens by a drilling tool such as an end mill or a drill. In the case that a peripheral edge processing and drilling are executed in a series of processing steps (routine) by such an apparatus, a flow in which all of the processing steps are completed can easily be known visually. For this reason, the drilling is executed after the peripheral edge processing is completed.

In a lens manufactured by plastic (hereinafter referred to as a plastic lens) which is the most general as the material of the lens, processing water is applied from a start of the peripheral edge processing to a completion thereof in order to cool a processed part of the lens. In a lens manufactured by polycarbonate (hereinafter referred to as a polycarbonate lens) having a high thermoplasticity, some heat is required for the peripheral edge processing. For this reason, the processing water is rarely applied in the peripheral edge processing. In order to prevent burning of a processed surface of the lens, however, the processing water is also applied in final finishing to be a final stage for the peripheral edge processing. When water sticks to the polycarbonate lens, however, the processing (cutting) is executed with very difficulty. When the drilling is executed after the peripheral edge processing is completed, therefore, a time required for the drilling is increased, and furthermore, a lifetime of the drilling tool is shortened. Although it is preferable that a step of blowing off the water sticking to the lens should be added after the peripheral edge processing is completed (between the peripheral edge processing and the drilling), a manufacturing cost is increased if a mechanism therefor is incorporated in an apparatus.

As a solving method, it is possible to propose the execution of the drilling before the peripheral edge processing. In the case in which a processing of forming a notch to be a semicircular hole is executed on an edge of a lens as drilling, and furthermore, chambering for rounding off the corner part of the edge of the lens, there is the following problem. More specifically, as described in U.S. Pat. No. 6,336,057 (JP-A-11-309657), it is preferable that a measurement of the shape of the lens to obtain chamfering data for the chamfering should be executed after roughing to be a first stage of the peripheral edge processing. If the notch is formed on the edge of the lens before the roughing, however, there is a possibility that the shape of the lens cannot be measured after the roughing. This problem might occur irrespective of the material of the lens.

SUMMARY OF THE INVENTION

The invention has a technical object to provide an eyeglass lens processing apparatus which can carry out a peripheral edge processing and drilling as a series of processing steps efficiently and well.

The invention has a feature to have the following structure in order to solve the problems.

(1) An eyeglass lens processing apparatus comprising:

a lens holding unit that holds an eyeglass lens;

a roughing tool;

a finishing tool;

a drilling tool;

a processing water supply unit that applies processing water to a processed part of the lens held by the lens holding unit; and a controller that controls driving operations of each of the tools and the processing water supply unit to execute roughing on the lens by the roughing tool without application of the processing water, drilling on the lens by the drilling tool without the application of the processing water after the roughing, and finishing on the lens by the finishing tool with the application of the processing water after the drilling.

(2) The eyeglass lens processing apparatus according to (1), further comprising a chamfering tool, wherein the controller controls the driving operations of each of the tools and the processing water supply unit to execute chamfering on the lens by the chamfering tool with the application of the processing water after the drilling.

(3) The eyeglass lens processing apparatus according to (1), further comprising a material setting unit for setting a material of an eyeglass lens to be processed, wherein, in the case that a material having a high thermoplasticity is set by the material setting unit, the controller controls the driving operations of each of the tools and the processing water supply unit to execute the roughing without the application of the processing water, the drilling without the application of the processing water after the roughing and the finishing with the application of the processing water after the drilling.

(4) The eyeglass lens processing apparatus according to (1), further comprising a material setting unit for setting a material of an eyeglass lens to be processed, wherein, the controller controls the driving operations of each of the tools and the processing water supply unit in order to execute the roughing without the application of the processing water, the drilling without the application of the processing water after the roughing, and the finishing with the application of the processing water after the drilling in the case that polycarbonate is set by the material input unit, and controls the driving operations of each of the tools and the processing water supply unit to execute the roughing with the application of the processing water, the drilling without the application of the processing water after the roughing, and the finishing with the application of the processing water after the drilling in the case that plastic is set by the material setting unit.

(5) The eyeglass lens processing apparatus according to (1), wherein the drilling includes at least one of processing of forming a through hole on a refractive surface of the lens, processing of forming a non-through hole on the refractive surface of the lens, and processing of forming a semicircular hole on an edge of the lens.

(6) The eyeglass lens processing apparatus according to (1), further comprising:

a data input unit for inputting data on a target lens shape; and a lens measuring unit for measuring a shape of the lens based on the data on the target lens shape, wherein the controller controls a driving operation of the lens measuring unit to measure the shape of the lens after the roughing.

DETAILED DESCRIPTION OF PREFERRED EMBODIMENTS

Figure 1:
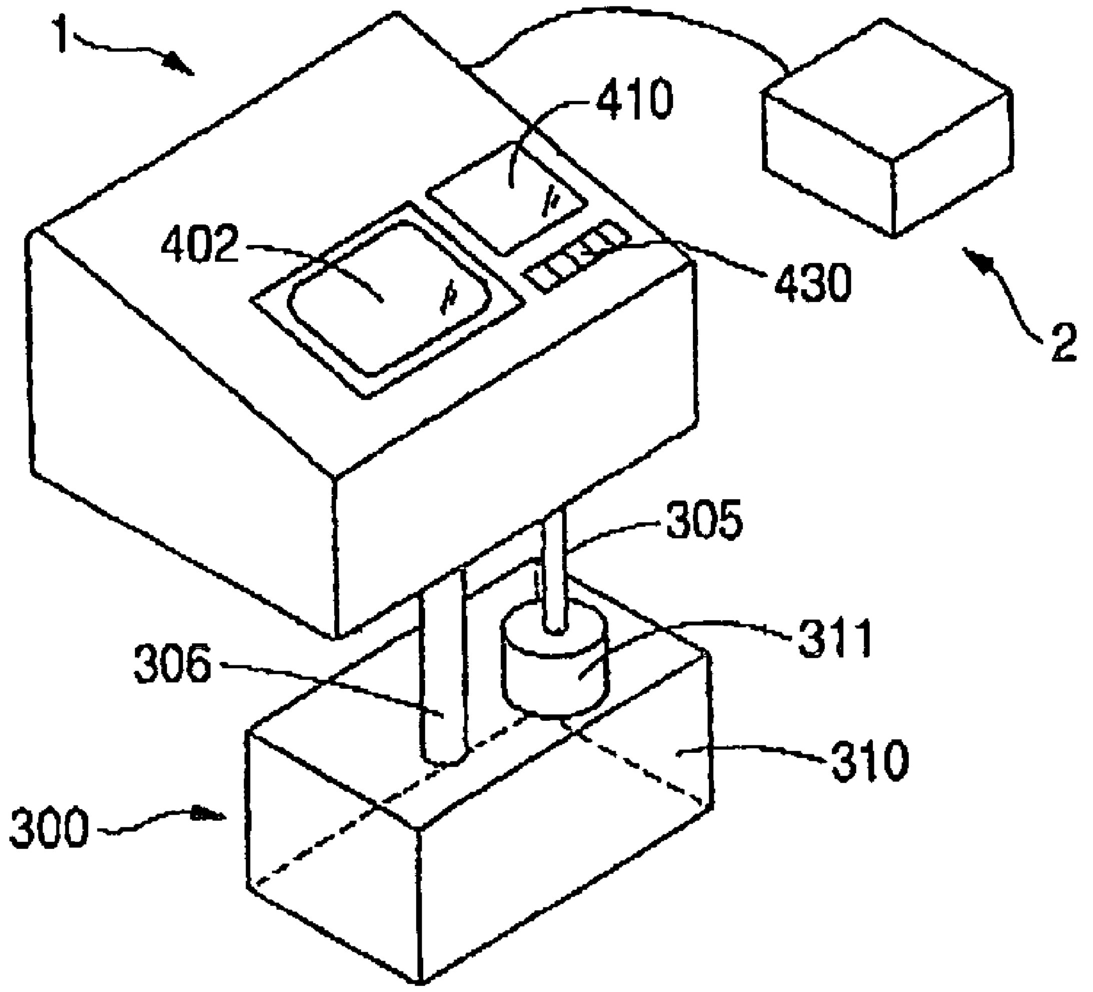
FIG. 1 is a schematic view showing an appearance of an eyeglass lens processing apparatus according to an embodiment of the invention.

An embodiment of the invention will be described below with reference to the drawings. FIG. 1 is a schematic view showing an appearance of an eyeglass lens processing apparatus 1 according to an embodiment of the invention. An eyeglass frame measuring device 2 is connected to the processing apparatus 1. For the measuring device 2, it is possible to use a device described in U.S. Pat. No. 5,333,412 (JP-A-4-93164) and U.S. Re. 35898 (JP-A-5-212661), for example. An upper part of the processing apparatus 1 is provided with a touch panel 410 serving as a display portion for displaying processing information and an input portion for inputting processing conditions, and a switch portion 430 having a switch for giving an instruction for a processing, for example, a processing start switch. A lens to be processed is processed in a processing chamber in an opening window 402. In the processing, processing water can be supplied into the processing chamber by a processing water supply unit 300 (which will be described below in detail). The processing apparatus 1 may be integrated with the measuring device 2.

Figure 2:
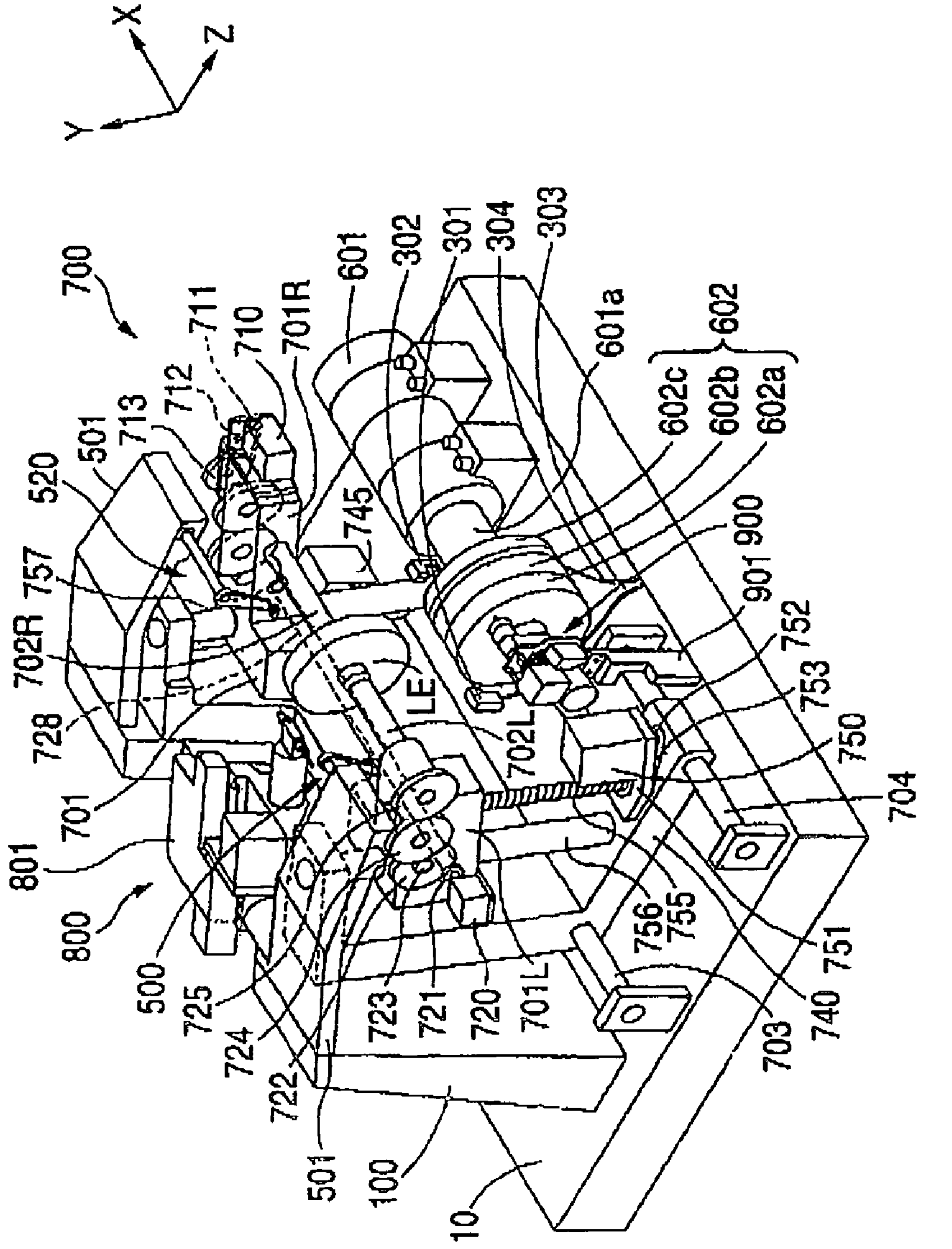
FIG. 2 is a schematic view showing a structure of a lens processing portion.

FIG. 2 is a schematic view showing a structure of a lens processing portion disposed in a housing of the processing apparatus 1. A carriage portion 700 including a carriage 701 and a moving mechanism thereof is mounted on a base 10. A lens LE to be processed is held (chucked) by lens chuck shafts 702L and 702R which are held rotatably on the carriage 701 and is thus rotated, and is subjected to grinding by a grindstone 602. The grindstone 602 according to the embodiment includes a roughing grindstone 602*a*, a bevel-finishing and flat-finishing grindstone 602*b*, and a bevel-polishing and flat-polishing grindstone 602*c*. A grindstone rotating shaft 601*a* having the grindstone 602 attached thereto is coupled to a grindstone rotating motor 601.

The chuck shafts 702L and 702R are held by the carriage 701 in such a manner that central axes thereof (a rotating central axis of the lens LE) is parallel with a central axis of the shaft 601*a* (a rotating central axis of the grindstone 602). The carriage 701 can be moved in a direction of the central axis of the shaft 601*a* (a direction of the central axes of the chuck shafts 702L and 702R) (an X-axis direction), and furthermore, can be moved in an orthogonal direction to the X-axis direction (a direction in which a distance between the central axes of the chuck shafts 702L and 702R and the central axis of the shaft 601*a* is changed) (a Y-axis direction).

<Lens Holding (Chuck) Mechanism>

The chuck shaft 702L and the chuck shaft 702R are held on a left arm 701L and a right arm 701R in the carriage 701 rotatably and coaxially, respectively. A lens chuck motor 710 is fixed to the right arm 701R, and a rotation of the motor 710 is transmitted to a feed screw (not shown) coupled to a pulley 713 through a pulley 711 attached to a rotating shaft of the motor 710, a belt 712 and the pulley 713, a feed nut (not shown) into which the feed screw is screwed is moved in an axial direction thereof by a rotation of the feed screw and the chuck shaft 702R coupled to the feed nut is moved in an axial direction thereof by the movement of the feed nut. Consequently, the chuck shaft 702R is moved in such a direction as to approach the chuck shaft 702L so that the lens LE is held (chucked) by the chuck shafts 702L and 702R.

<Lens Rotating Mechanism>

A lens rotating motor 720 is fixed to the left arm 701L, and a rotation of the motor 720 is transmitted to the chuck shaft 702L through a gear 721 attached to a rotating shaft of the motor 720, a gear 722, a gear 723 which is coaxial with the gear 722, a gear 724 and a gear 725 attached to the chuck shaft 702L so that the chuck shaft 702L is rotated. Moreover, the rotation of the motor 720 is transmitted to the chuck shaft 702R through a rotating shaft 728 coupled to the rotating shaft of the motor 720 and the same gears as the gears 721 to 725 so that the chuck shaft 702R is rotated. Consequently, the chuck shafts 702L and 702R are rotated synchronously so that the held (chucked) lens LE is rotated.

<X-axis Direction Moving Mechanist of Carriage 701>

A moving support base 740 is movably supported on guide shafts 703 and 704 fixed in parallel with each other over the base 10 and extended in the X-axis direction. Moreover, an X-axis direction moving motor 745 is fixed onto the base 10, and a rotation of the motor 745 is transmitted to the support base 740 through a pinion (not shown) attached to a rotating shaft of the motor 745 and a rack (not shown) attached to a rear part of the support base 740 so that the support base 740 is moved in the X-axis direction. Consequently, the carriage 701 supported on guide shafts 756 and 757 fixed to the support base 740 is moved in the X-axis direction.

<Y-axis Direction Moving Mechanism of Carriage 701>

The carriage 701 is movably supported on the guide shafts 756 and 757 fixed to the support base 740 in parallel and extended in the Y-axis direction. Moreover, a Y-axis direction moving motor 750 is fixed to the support base 740 through a plate 751, and a rotation of the motor 750 is transmitted to a feed screw 755 held rotatably on the plate 751 through a pulley 752 attached to a rotating shaft of the motor 750 and a belt 753 so that the carriage 701 into which the feed screw 755 is screwed is moved in the Y-axis direction by a rotation of the feed screw 755.

Lens shape measuring portions 500 and 520 are disposed above the carriage 701. A drilling and grooving portion 800 is disposed behind the carriage 701. A chamfering portion 900 is disposed ahead of the carriage 701.

Figure 3:
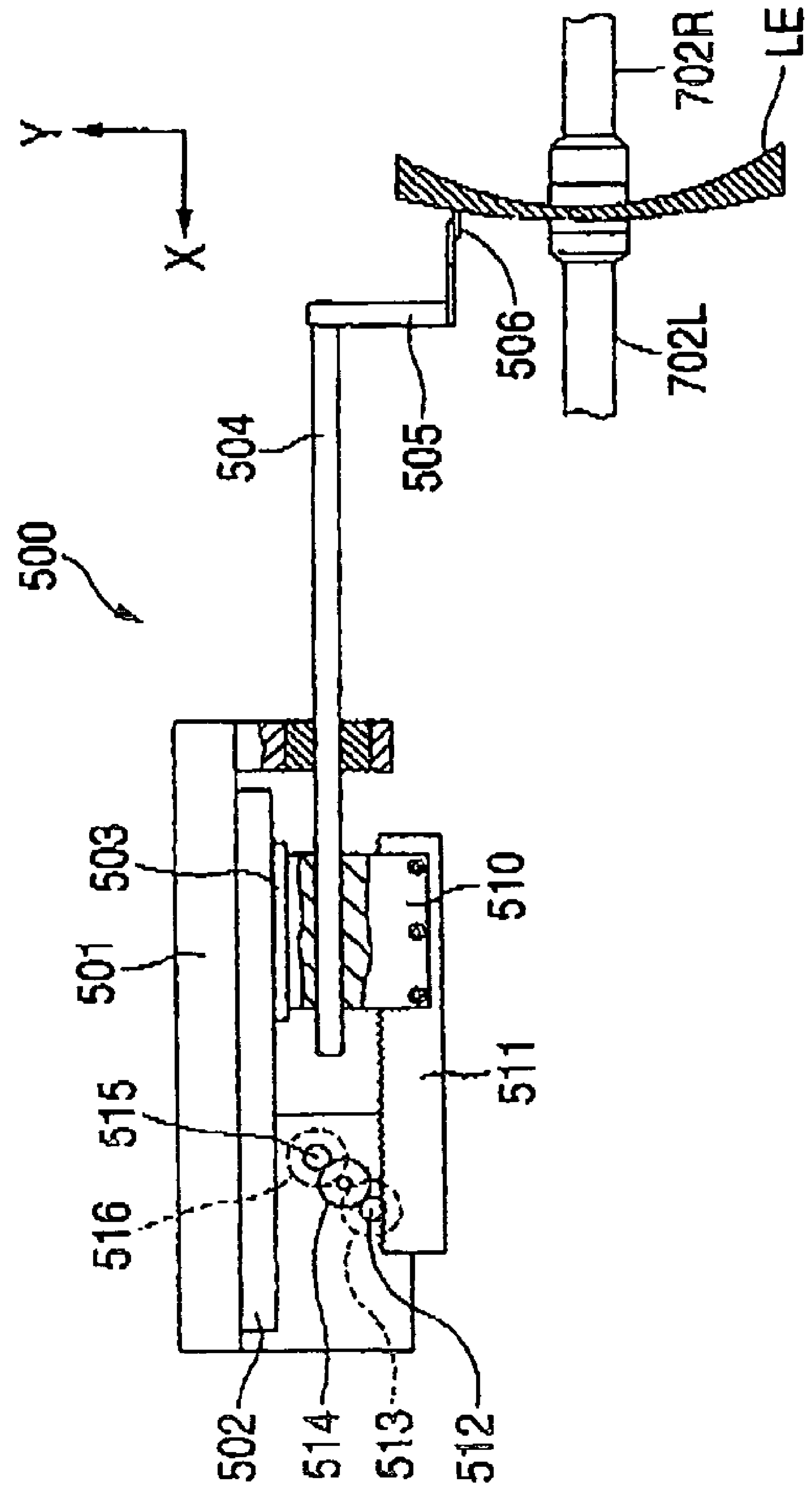
FIG. 3 is a schematic view showing a structure of a lens shape measuring portion.

FIG. 3 is a schematic view showing a structure of the lens shape measuring portion 500 for measuring a shape of a front refractive surface of the lens LE. A fixing support base 501 is fixed to a sub base 100 erected from the base 10 (see FIG. 2) and a slider 503 is movably supported on a guide rail 502 fixed to the support base 501 and extended in the X-axis direction.

A moving support base 510 is fixed to the slider 503 and a feeler arm 504 is fixed to the support base 510. An L-shaped feeler hand 505 is fixed to a tip of the arm 504 and a disc-shaped feeler 506 is attached to a tip of the hand 505. When measuring the shape of the front refractive surface of the lens LE, the feeler 506 is caused to abut on the front refractive surface of the lens LE.

A rack 511 is fixed to a lower part of the support base 510, and a pinion 512 attached to a rotating shaft of an encoder 513 fixed to the support base 501 is engaged with the rack 511. Moreover, a motor 516 is fixed to the support base 501 and a rotation of the motor 516 is transmitted to the rack 511 through a gear 515 attached to a rotating shaft of the motor 516, a gear 514 and the pinion 512 so that the rack 511, the support base 510 and the arm 504 are moved in the X-axis direction. During the measurement, the motor 516 always causes the feeler 506 to be pushed against the front refractive surface of the lens LE by a certain force. The encoder 513 detects an amount of the movement in the X-axis direction of the support base 510 (a position of the feeler 506). The shape of the front refractive surface of the lens LE is measured by the amount or the movement (the position) and rotating angles of the chuck shafts 702L and 702R.

Since the lens shape measuring portion 520 for measuring a shape of a rear refractive surface of the lens LE is laterally symmetrical about the lens shape measuring portion 500, description of a structure thereof will be omitted.

Figure 4:
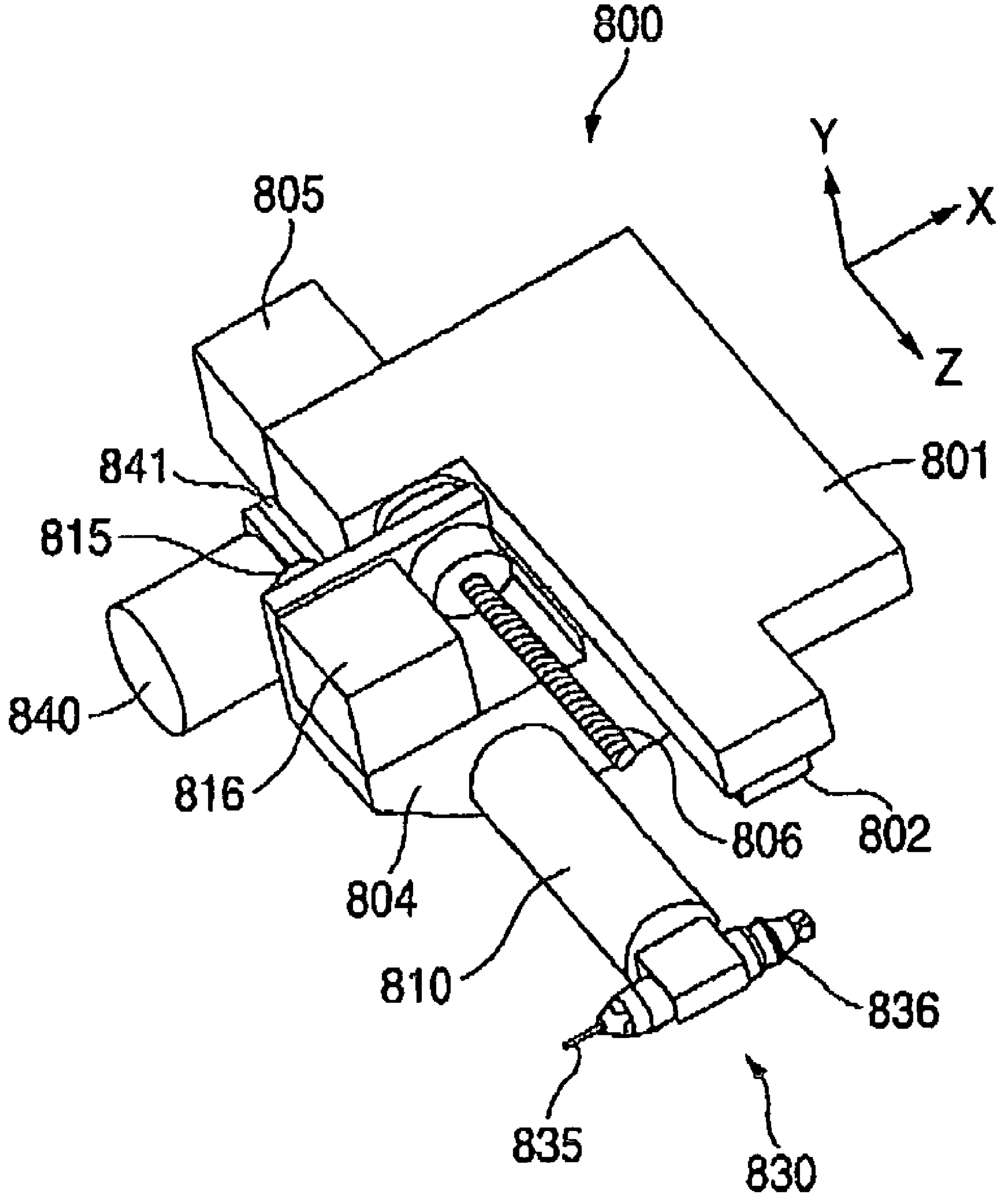
FIG. 4 is a view showing an appearance of a schematic structure of a drilling and grooving portion.
Figure 5:
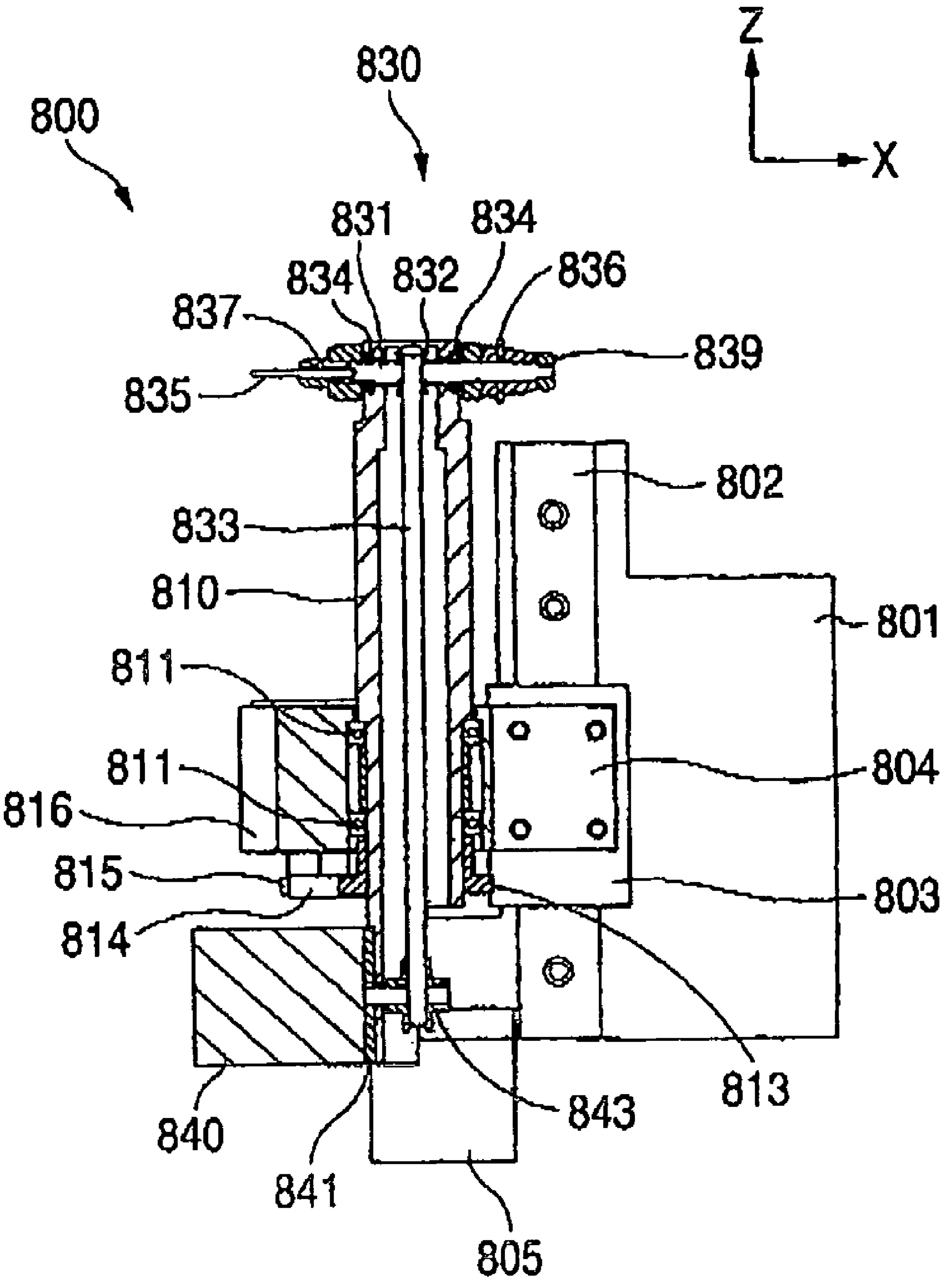
FIG. 5 is a sectional view showing the schematic structure of the drilling and grooving portion.

FIGS. 4 and 5 are schematic views showing a structure of the drilling and grooving portion 800. A fixing support base 801 to be a base of the portion 800 is fixed to the sub base 100 (see FIG. 2), and a slider 803 is movably supported on a guide rail 802 fixed to the support base 801 and extended in a Z-axis direction (an orthogonal direction to an XY-axis plane). A moving support base 804 is fixed to the slider 803, and a feed screw 806 coupled to a rotating shaft of a Z-axis direction moving motor 805 is screwed into the support base 804. The feed screw 806 is rotated by a rotation of the motor 805 fixed to the support base 801 so that the support base 804 is moved in the Z-axis direction.

A rotating support base 810 is rotatably supported pivotally on the support base 804 through a bearing 811, and a gear 813 is fixed to the support base 810 on either side of the bearing 811. A holder rotating motor 816 is fixed to the support base 804, and a rotation of the motor 816 is transmitted to the support base 810 through a gear 815 attached to a rotating shaft of the motor 816, a gear 814 and the gear 813 so that the support base 810 is rotated around an axis of the bearing 811.

A processing tool holder 830 for holding a processing tool is provided on a tip of the support base 810. The holder 830 is moved in the Z-axis direction by a movement of the support base 804 executed by the motor 805 and is rotated by the rotation of the support base 810 executed by the rotation of the motor 816. A rotating shaft 831 is rotatably supported pivotally on the holder 830 through two bearings 834 and has one of ends to which an end mill 835 to be a drilling tool is attached through a chuck portion 837 and the other end to which a cutter 836 to be a grooving tool is attached through a nut 839. The cutter 836 has a diameter of approximately 15 mm. For the grooving tool, a grindstone may be used in place of a cutter.

An end mill and cutter rotating motor 840 are fixed to the support base 810 through a plate 841, and a rotation of the motor 840 is transmitted to the shaft 831 through a pulley 843 attached to a rotating shaft of the motor 840, a belt 833 and a pulley 832 attached to the shaft 831 so that the shaft 831 is rotated. Consequently, the end mill 835 and the cutter 836 are rotated.

Figure 6:
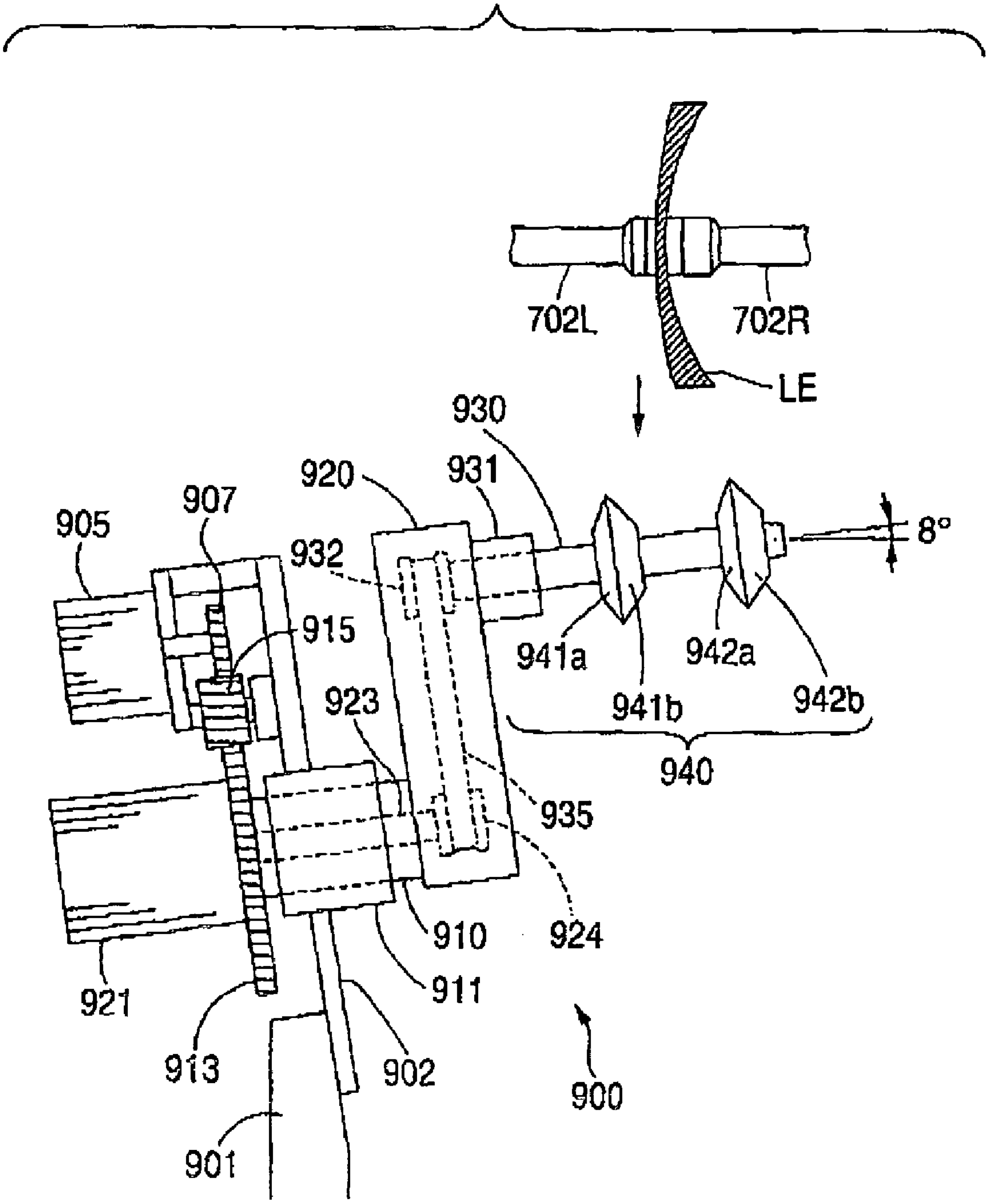
FIG. 6 is a view showing a schematic structure of a chamfering portion.

FIG. 6 is a schematic view showing a structure of the chamfering portion 900. A fixing support base 901 to be a base of the chamfering portion 900 is fixed onto the base 10 (see FIG. 2), and a plate 902 is fixed to the support base 901. A motor 905 for rotating an arm 920 and moving a grindstone portion 940 to a processing position and a retracting position is fixed above the plate 902. A holding member 911 for rotatably holding an arm rotating member 910 is fixed to the plate 902 and a gear 913 is fixed to the rotating member 910 extended to a left side of the plate 902. A rotation of the motor 905 is transmitted to the rotating member 910 through a gear 907 attached to a rotating shaft of the motor 905, a gear 915 and the gear 913 so that the arm 920 fixed to the rotating member 910 is rotated.

A grindstone rotating motor 921 is fixed to the gear 913 and a rotation of the motor 921 is transmitted to a rotating shaft 930 through a rotating shaft 923 coupled to a rotating shaft of the motor 921 and held rotatably on the rotating member 910, a pulley 924 attached to the shaft 923, a belt 935, and a pulley 932 attached to the rotating shaft 930 held rotatably on a holding member 931 fixed to the arm 920 so that the shaft 930 is rotated. Consequently, a chamfering grindstone 941*a* for a lens rear surface, a chamfering grindstone 941*b* for a lens front surface, a chamfer-polishing grindstone 942*a* for a lens rear surface and a chamfer-polishing grindstone 942*b* for a lens front surface which are attached to the shaft 930 are rotated. A rotating axis of the shaft 930 is disposed with an inclination of approximately 8 degrees with respect to the rotating axes of the chuck shafts 702L and 702R and the grindstone portion 940 is easily provided along a lens curve. The chamfering grindstones 941*a* and 941*b* and the chamber-polishing grindstones 942*a* and 942*b* have outside diameters of approximately 30 mm.

In the chambering, the arm 920 is rotated by the motor 905 so that the grindstone portion 940 is moved from the retracting position to the processing position. The processing position of the grindstone portion 940 is placed between the chuck shafts 702L and 702R and the shaft 601 in such a manner that the rotating axis of the shaft 930 is disposed on a plane on which both rotating axes of the chuck shaft 702L and 702R and the shaft 601 are positioned. In the same manner as a peripheral edge processing to be executed by the grindstone 602, consequently, a distance between the rotating axes of the chuck shafts 702L and 702R and the rotating axis of the shaft 930 is changed by the motor 751.

The processing water supply unit 300 will be described. In the vicinity of the grindstone 602, nozzles 301 and 302 for jetting processing water are disposed to chuck the grindstone 602 therebetween (see FIG. 2). The nozzles 301 and 302 are turned in such a manner that the processing water thus jetted hits on a surface of the grindstone 602. The nozzles 301 and 302 are connected to a tank 310 through tubes 303 and 304 and a tube 305, and the processing water is supplied to the nozzles 301 and 302 by the driving operation of a pump 311. A water discharging port (not shown) is provided in a lower part of the grindstone 602, that is, a lower part of the processing chamber, and the processing water discharged from the water discharging port is fed to the tank 310 through a pipe 306. A waste of the lens LE is mixed in the processing water fed to the tank 310. For this reason, the processing water is filtered in the tank 310 and is supplied to the nozzles 301 and 302 by the pump 311 again.

Figure 7:
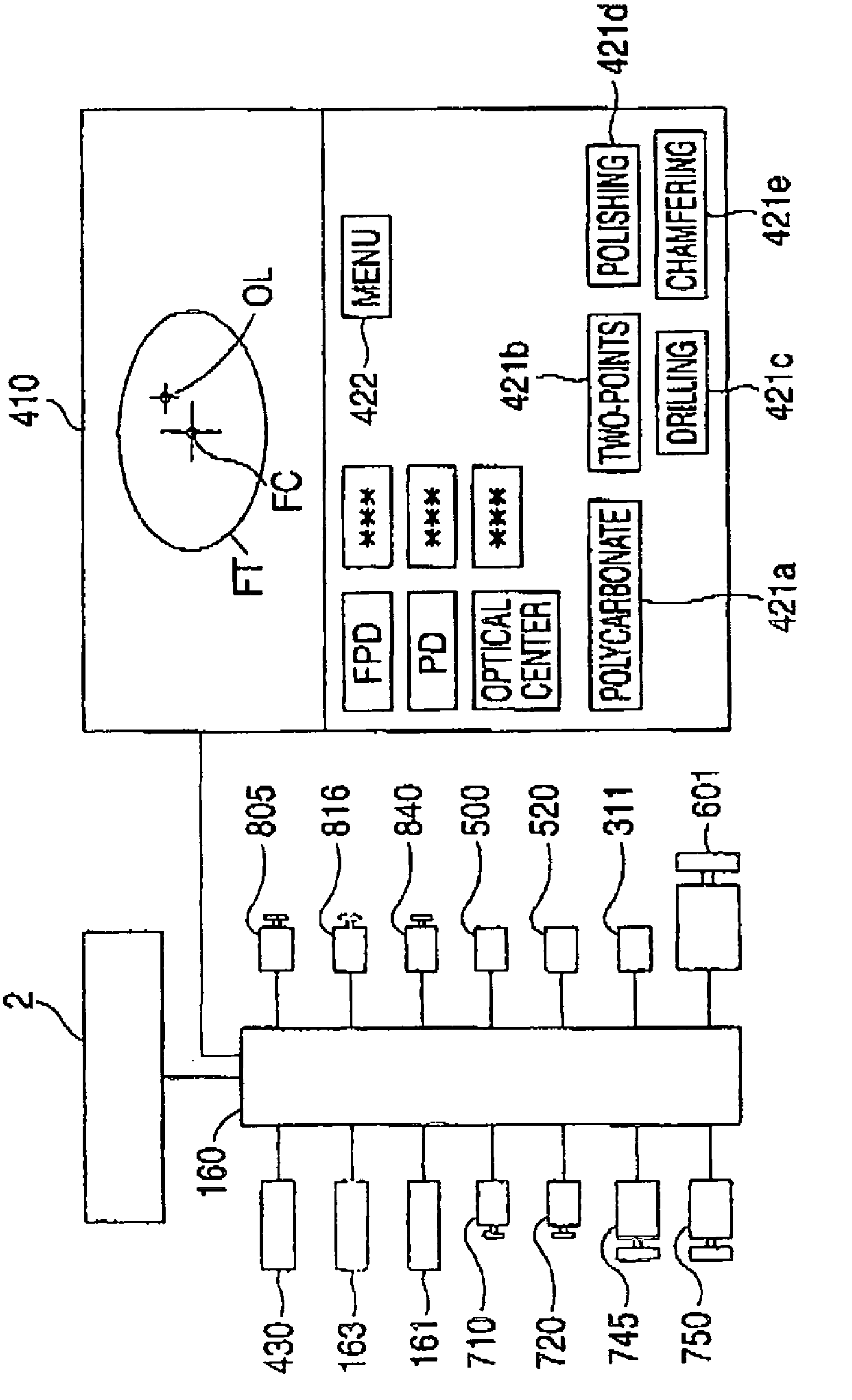
FIG. 7 is a schematic block diagram showing a control system of the eyeglass lens processing apparatus.

Referring to an operation of the apparatus having the structure, the drilling will be mainly described with reference to a schematic block diagram showing a control system in FIG. 7.

First of all, shapes of left and right rims of an eyeglass frame are measured by the measuring device 2 so that data on a target lens shape are obtained. In case of a rimless frame, a shape of a template and that of a dummy lens are measured so that the data on a target lens shape thereof are obtained. The data on the target lens shape which are transferred from the measuring device 2 are stored in a memory 161. When the data on the target lens shape are input, a target lens shape graphic FT based on the data on the target lens shape is displayed on a screen of the touch panel 410. An operator operates a touch key displayed on the touch panel 410 to input layout data such as an FPD (a distance between geometric centers of the left and right rims), a PD (a distance between pupils) of a user and a height of an optical center OL with respect to a geometrical center FC of the target lens shape. A numerical value of layout data is input by a ten key displayed by pressing down a "PD" key. Moreover, the operator sets (inputs) a material of the lens LE by a key 421*a*, a type of the eyeglass frame by a key 421*b*, a processing mode by a key 421*c*, presence of polishing by a key 421*d* and presence of chamfering by a key 421*e*, respectively. By setting these processing conditions, processing steps are determined by a main control portion 160 in accordance with a program which is prestored in a memory 163. In the embodiment, it is assumed that a two-point frame is set as the type of the eyeglass frame.

Figure 8:
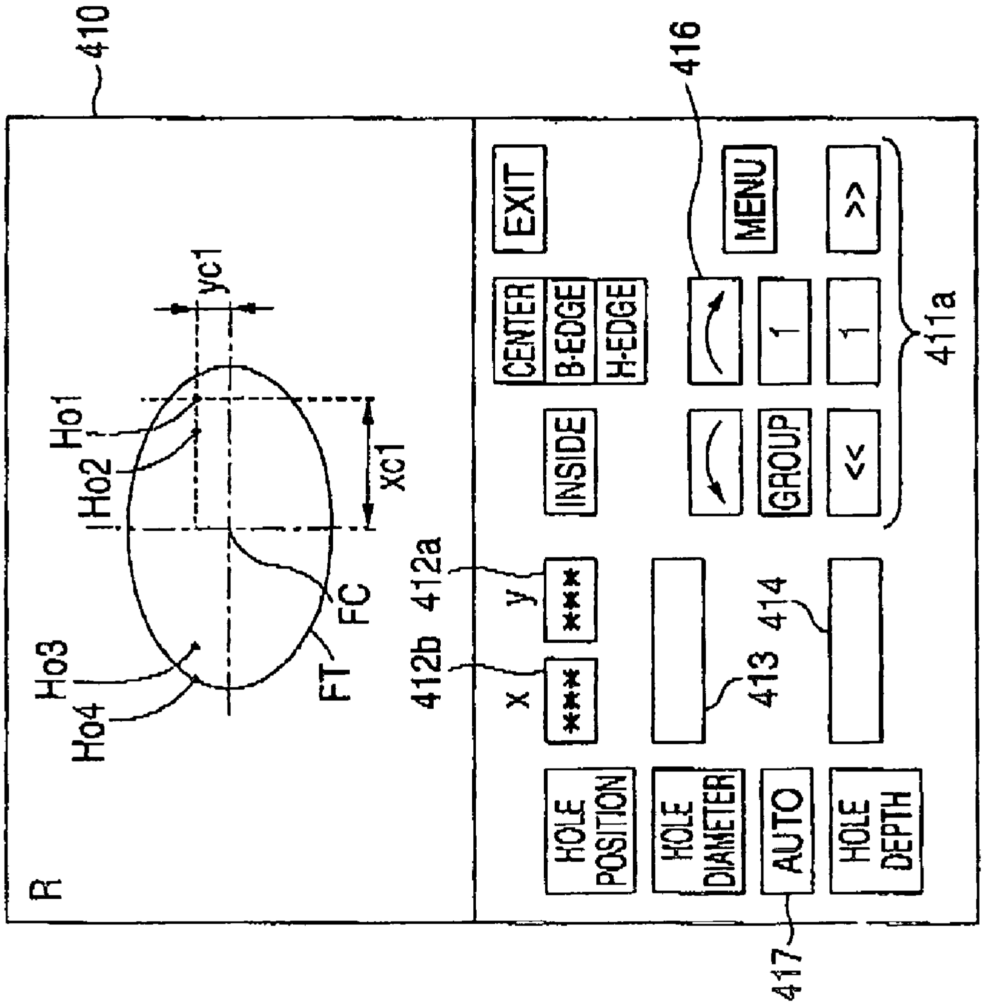
FIG. 8 is a view showing a hole position setting screen displayed on a touch panel.

In the case in which the two-point frame is set, a hole position setting screen is displayed when a menu key 422 is pressed down. FIG. 8 shows an example of the screen. Description will be given by taking, as an example, the case in which two holes Ho1 and Ho2 are formed on a nose side of a front refractive surface of a lens to which the frame is attached and a hole Ho3 and a notch Ho4 are formed on an ear side. In FIG. 8, Ho1 to Ho4 indicate respective hole positions. Data on the hole position are input through a rectangular coordinate system in which a transverse direction is set to be an x axis and a vertical direction is set to be a y axis based on the geometrical center FC, for example (the transverse and vertical directions in use of eyeglasses). In the case in which position data on the hole Ho1 are input, a hole number is specified by a key 411*a* and a y-axis data column 412*a* is then specified for y-axis position data and a dimension yc1 based on the center FC is thus input. For x-axis position data, an x-axis data column 412*b* is specified to input a dimension xc1 based on the center FC. For the other holes, hole numbers are changed and the input is carried out in the same manner.

In the case in which the holes Ho1 and Ho2 are formed in parallel with each other, a group number is input by a key 416. When "auto" is specified by a hole angle specifying key 417, they are formed perpendicularly to the front refractive surface of the lens in a middle position of holes in the same group.

The case of the holes Ho3 and Ho4 are the same. In FIG. 8, 413 denotes a hole diameter data input column and 414 denotes a hole depth data input column. These dimensions are also input by the ten key displayed by pressing down each data key. The hole position data and the like thus input are stored in the memory 161.

When necessary data such as the hole position data can be input, the lens LE is held (chucked) between the chuck shafts 702L and 702R and the processing start switch of the switch portion 430 is pressed down to operate the apparatus.

Figure 9:
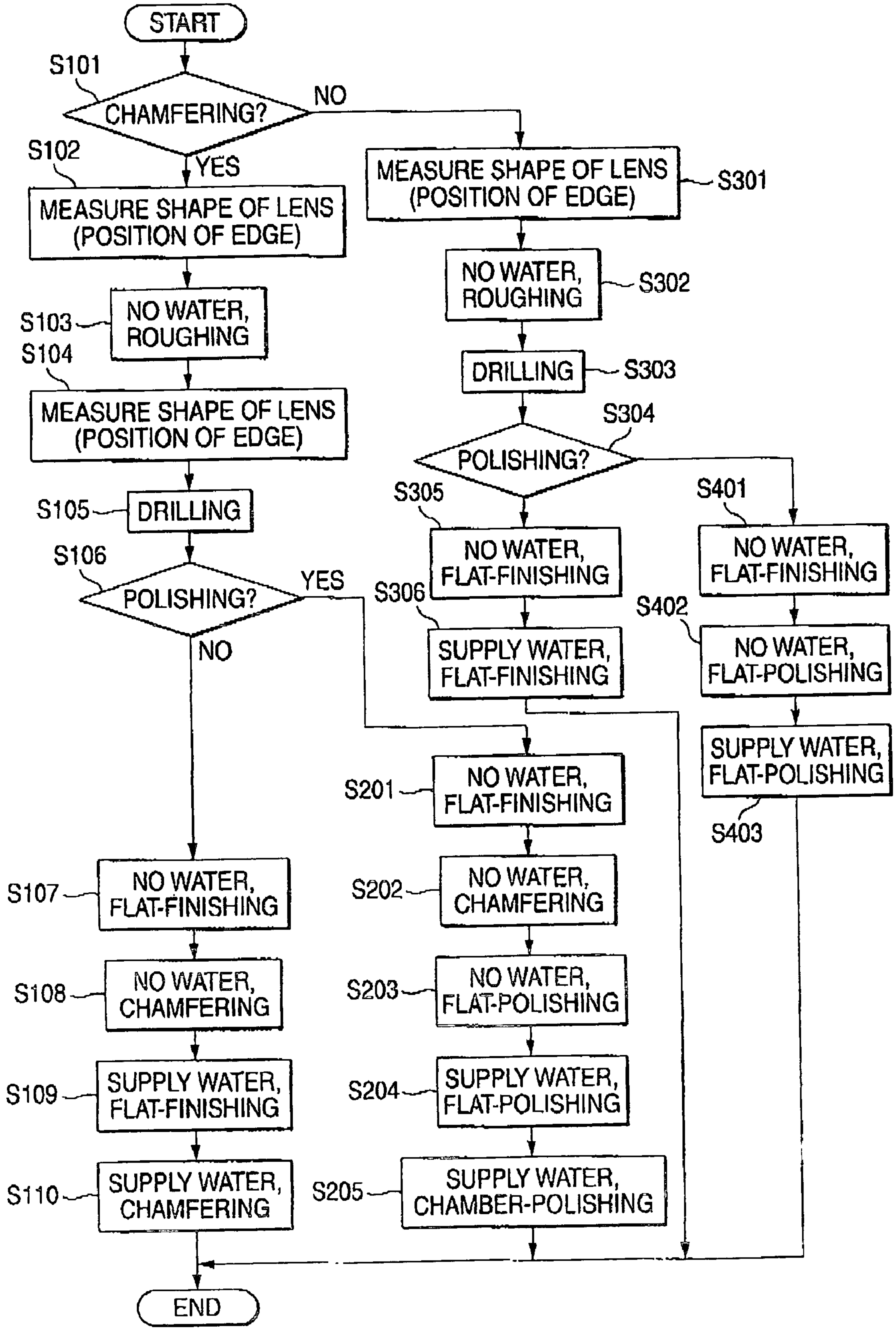
FIG. 9 is a flowchart showing processing steps.

FIG. 9 is a flowchart showing processing steps in the case in which a polycarbonate lens is set. The main control portion 160 controls the lens shape measuring portions 500 and 520 based on the data on the target lens shape which is input and measures the shape of the lens before the roughing. When the chamfering is set (S101 YES), the shape of the lens is measured before the roughing in order to confirm a shortage of the diameter of the lens LE (S102). If the diameter of the lens is not insufficient in the measurement of the shape of the lens, the processing proceeds to the roughing. The main control portion 160 moves the carriage 701 by the motor 745 in such a manner that the lens LE is positioned on the roughing grindstone 602*a* and vertically moves the carriage 701 by the motor 750 on the basis of data on the roughing data obtained based on the data on the target lens shape, and at the same time, the lens LE is rotated by the motor 720 to execute the roughing. In the polycarbonate lens, the processing water is applied in only a final finishing stage in order to prevent the burning of a surface to be processed. For this reason, the processing water is not applied in the roughing (S103). The data on the roughing are calculated by an estimation of a lens margin allowed for finishing of approximately 1 mm for a final finishing shape.

When the roughing is ended, the shape of the lens is measured based on the data on the target lens shape and the shape of the lens is measured based on the data on the hole position (S104). First of all, the main control portion 160 drives the motor 516 to position the arm 504 from a retracting position to a measuring position and then drives the motor 750 to move the carriage 701 based on data on a vector of the target lens shape (Rn, θn) (n=1, 2, . . . , N), and furthermore, drives the motor 516 to move the arm 504 toward the lens LE side in such a manner that the feeler 506 abuts on the front refractive surface of the lens LE. In a state in which the feeler 506 abuts on the front refractive surface, the motor 750 is driven to move the carriage 701 vertically in accordance with data on the vector while the motor 720 is driven to rotate the lens LE With the rotation and movement of the lens LE, the feeler 506 is moved in a direction of the central axes of the chuck shaft 702L and 702R (the X-axis direction) along the front refractive surface shape of the lens LE. An amount of the movement is detected by the encoder 513 and the front refractive surface shape of the lens LE (Rn, θn, zn) (n=1, 2, . . . , N) is measured. zn indicates a height (thickness) of the front refractive surface of the lens LE. A rear refractive surface shape of the lens LE is also measured by the lens shape measuring portion 520. Data on the front and rear refractive surface shapes of the lens LE thus measured are stored in the memory 161.

Moreover, the main control portion 160 measures an edge position on a front refractive surface side of the lens and an edge position on a slight inside or outside in the same longitudinal direction (for example, 0.5 m) for each hole position by the lens shape measuring portion 500 in order to obtain the edge position of the hole position. The main control portion 160 obtains an inclination angle of the lens front refractive surface which serves to position the hole by the measurement of the lens shape for each hole position.

By the measurement of the lens shape (the measurement of the edge position) to be executed after the roughing, it is possible to subsequently perform the drilling and the chamfering with high precision. More specifically, before and after the roughing, a position in the X-axis direction of the lens refractive surface or a lens refractive surface curve is varied due to a deformation caused by the hold of the chuck shafts 702L and 702R or an internal stress of the lens depending on a target lens shape. By the measurement of the shape of the lens after the roughing, it is possible to obtain the position of the lens refractive surface with high precision.

Figure 10:
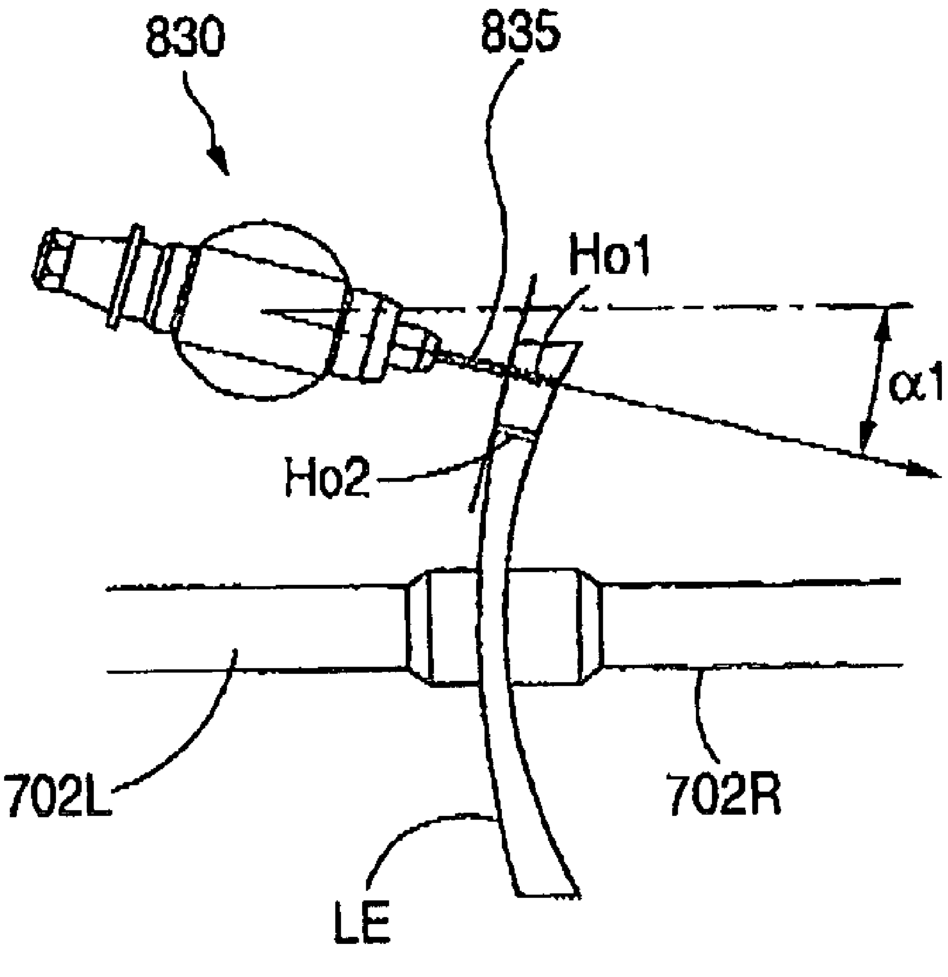
FIG. 10 is a view showing a drilling to be executed by an end mill.

When the measurement of the shape of the lens is completed, the processing proceeds to the drilling (S105). The main control portion 160 controls the movement of the processing portion 800 and the carriage 701 in accordance with position data on each of the holes Ho1 to Ho4. In the case in which the holes Ho1 and Ho2 are arranged to execute the processing in parallel with a perpendicular direction to the lens front refractive surface (a direction of a normal), a hole angle α1 is obtained in such a manner that a middle position between the two holes is perpendicular to the lens front refractive surface as shown in FIG. 10. An inclination angle of the lens front refractive surface is obtained from a result of the measurement of the shape of the lens based on hole position data. The main control portion 160 inclines a rotating axis of the end mill 835 by the angle α1 with respect to the X-axis direction, and furthermore, controls a rotation and a movement in an XY-axis direction of the lens LE and places the tip of the end mill 835 in the position of the hole Ho1. Then, the end mill 835 is rotated by the motor 840, thereby moving the carriage 701 in the XY-axis direction in the axial direction of the rotating axis of the end mill 835 (the direction of the inclination angle α1). Thus, the drilling is executed. Referring to another hole Ho2, similarly, the tip of the end mill 835 is placed in the position of the hole Ho2 with the angle α1, thereby carrying out the processing in the same manner. The drilling is executed in a previous stage for the application of the processing water. Therefore, the cutting property of the end mill 835 over the lens LE can be prevented from being extremely deteriorated.

Figure 11A:
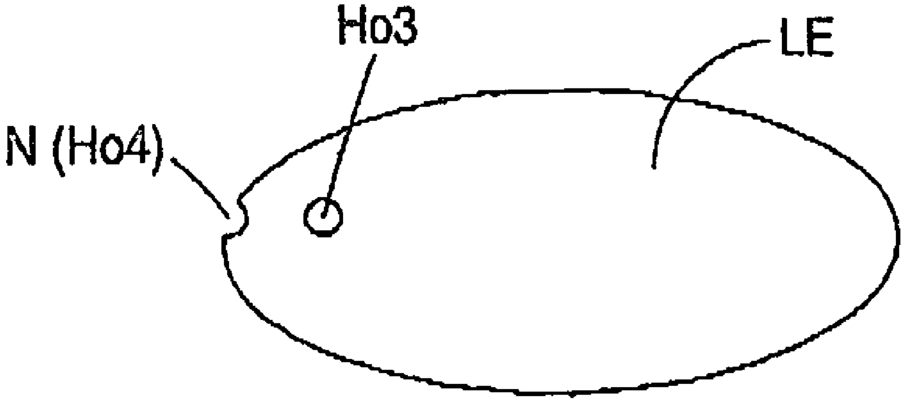
FIGS. 11A and 11B are views showing a processing of forming a notch on an edge of the lens.
Figure 11B:
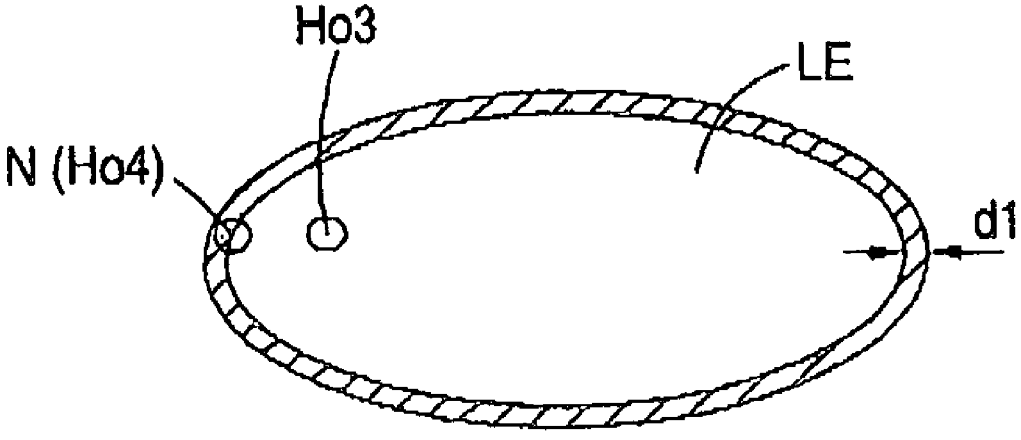

In the case in which a processing of forming a semicircular notch N on the edge of the lens LE is executed (Ho4 in the embodiment) (see FIGS. 11A and 11B), moreover, the flat-finishing has not been performed with the lens margin allowed for finishing, which is advantageous. More specifically, in the case in which the processing of forming the notch N is executed after the lens LE is subjected to the flat-finishing as shown in FIG. 11A, the tip of the end mill 835 is positioned on the edge of the lens LE. For this reason, the tip of the end mill 835 gets away so that the end mill 835 is damaged and broken in some cases. On the other hand, when the tip of the end mill 835 is positioned to execute the processing of forming the notch N in a state in which a lens margin allowed for finishing d1 (for example, 1 mm) is left as shown in FIG. 11B, the tip of the end mill 835 does not get away so that the end mill 835 can be prevented from being broken.

While the processing of forming a through hole has been described above, a processing of forming a counterbore (a non-through hole) is executed in the same manner. Moreover, the purpose of carrying out the drilling over the lens is not restricted to the attachment of an eyeglass frame. For example, the purpose also includes a processing of forming an ornamental hole on the lens.

When the drilling is completed, the processing proceeds to the flat-finishing. If the polishing is not set (S106 NO), the main control portion 160 moves the lens LE to the flat part of the finishing grindstone 602*b* and vertically moves the carriage 701 to execute the flat-finishing based on data on the flat-finishing (S107). Subsequently, the processing proceeds to the chamfering. The main control portion 160 calculates the data on the chamfering based on the result of the measurement executed after the roughing (since the calculation of the data on the chamfering is well-known as described in U.S. Pat. No. 6,336,057 (JP-A-11-309657), description will be omitted). The main control portion 160 drives the motor 905, thereby placing the shaft 930 in a predetermined processing position. Thereafter, the position of the carriage 701 is controlled based on the data on the chamfering for the front and rear surfaces of the lens, and the chamfering for the rear surface of the lens is executed by the chamfering grindstone 941*a* and the chamfering for the front surface of the lens is executed by the chamfering grindstone 941*b* (S108). The above flat-finishing and chamfering is executed without the application of the processing water.

Next, the processing proceeds to the final finishing in which the processing water is applied. The main control portion 160 drives the pump 311 to apply the processing water, and furthermore, moves the lens LE to the flat part of the finishing grindstone 602*b* again, thereby moving the carriage 701 vertically to execute the flat-finishing based on data on the flat-finishing (S109). At this time, the grindstone 602*b* is rotated at a high speed than the flat-finishing without application of the processing water so that the burning of the processed surface is removed and the flat-finishing is completed finely. Referring to the chamfering portion, similarly, the rear and front surfaces of the lens are subsequently subjected to the chamfering by the chamfering grindstones 941*a* and 941*b* respectively while the processing water is applied (S110). A this time, similarly, the chamfering grindstones 941*a* and 941*b* are rotated at a high speed than the chamfering without application of the processing water so that the burning of the processed surface is removed and the flat-finishing is completed finely.

In the conventional processing steps in which the drilling is executed after the completion of the peripheral edge processing, the processing water is not applied in the drilling. For this reason, the processing water is applied after the completion of the drilling so that a waste is washed away. On the other hand, the drilling is executed before the peripheral edge processing is performed with the application of the processing water. Consequently, it is possible to omit the step of washing away the waste.

If the polishing is set (S106 YES), the flat-polishing without application of the processing water is executed by the polishing grindstone 602*c* (S203) after the flat-finishing without application of the processing water (S201) and the chamfering without application of the processing water (S202). In order to remove the burning of the processed surface to put a gloss, then, the flat-polishing with the application of the processing water is executed by the polishing grindstone 602*c* (S204), and furthermore, the chamber-polishing with the application of the processing water is executed by the chamber-polishing grindstones 942*a* and 942*b* (S205).

If the chambering is not set (S101 NO), S301 to S306 and S401 to S403 of the flowchart in FIG. 9 are performed but it is preferable that at least the rear surface of the lens should be subjected to the chamfering in case of a rimless frame. In case that chamfering is not executed, moreover, the measurement of the shape of the lens based on the target lens shape data and the measurement of the shape of the lens based on the hole position data may be executed in a lens shape measuring stage before the roughing without application of the processing water (S301). For the reasons described above, it is preferable that the shape of the lens should be measured after the roughing.

The description has been given to the case in which the polycarbonate lens is set. In the case in which a plastic lens is specified, S109, S110, S204, S205, S306 and S403 are omitted from the processing steps of the flowchart in FIG. 9 and the processing water is basically applied in all of the roughing, the flat-finishing and the chamfering.

In the description, moreover, the drilling is executed before the flat-finishing after the shape of the lens is measured after the roughing (a state in which the lens margin allowed for finishing is left). In case of a processing of forming a normal circular hole in place of a notch, however, the drilling is preferably executed before the processing of applying the processing water (S109, S204, S306 and S403).

Furthermore, the description has been given to the polycarbonate lens having a high thermoplasticity which requires some heat for the peripheral edge processing. A lens manufactured by Trivex™ also has the same property as that of the polycarbonate lens (which requires some heat for the peripheral edge processing and the application of the processing water in the final stage of the peripheral edge processing (the final finishing)), and the processing steps in FIG. 9 are also applied to them.

What is claimed is:

1. An eyeglass lens processing apparatus comprising:

a lens holding unit that holds an eyeglass lens;

a roughing tool;

a finishing tool;

a drilling tool;

a processing water supply unit that applies processing water to a processed part of the lens held by the lens holding unit; and a controller that controls, in accordance with a program, driving operations of each of the tools and the processing water supply unit to execute roughing on the lens by the roughing tool without application of the processing water, drilling on the lens by the drilling tool without the application of the processing water after the roughing, and finishing on the lens by the finishing tool with the application of the processing water after the drilling.

2. The eyeglass lens processing apparatus according to claim 1, further comprising a chamfering tool, wherein the controller controls the driving operations of each of the tools and the processing water supply unit to execute chamfering on the lens by the chamfering tool with the application of the processing water after the drilling.

3. The eyeglass lens processing apparatus according to claim 1, further comprising a material setting unit for setting a material of an eyeglass lens to be processed, wherein, in the case that a polycarbonate material is set by the material setting unit, the controller controls the driving operations of each of the tools and the processing water supply unit to execute the roughing without the application of the processing water, the drilling without the application of the processing water after the roughing and the finishing with the application of the processing water after the drilling.

4. The eyeglass lens processing apparatus according to claim 1, further comprising a material setting unit for setting a material of an eyeglass lens to be processed, wherein, the controller controls the driving operations of each of the tools and the processing water supply unit in order to execute the roughing without the application of the processing water, the drilling without the application of the processing water after the roughing, and the finishing with the application of the processing water after the drilling in the case that polycarbonate is set by the material input unit, and controls the driving operations of each of the tools and the processing water supply unit to execute the roughing with the application of the processing water, the drilling without the application of the processing water after the roughing, and the finishing with the application of the processing water after the drilling in the case that plastic other than the polycarbonate is set by the material setting unit.

5. The eyeglass lens processing apparatus according to claim 1, wherein the drilling includes at least one of processing of forming a through hole on a refractive surface of the lens, processing of forming a non-through hole on the refractive surface of the lens, and processing of forming a semicircular hole on an edge of the lens.

6. The eyeglass lens processing apparatus according to claim 1, further comprising:

a data input unit for inputting data on a target lens shape; and a lens measuring unit for measuring a shape of the lens based on the data on the target lens shape, wherein the controller controls a driving operation of the lens measuring unit to measure the shape of the lens after the roughing.

* * * * *